(12) United States Patent
Lung et al.

(10) Patent No.: US 7,511,399 B2
(45) Date of Patent: Mar. 31, 2009

(54) STATOR ASSEMBLY FOR AN ELECTRICAL MACHINE

(75) Inventors: Eberhard Lung, Ludwigsburg (DE); Oliver Eckert, Remseck (DE); Ricardo Chombo Vidales, Steinbach (DE); Christa Bauch, Grossbottwar (DE); Quoc-Dat Nguyen, Reutlingen (DE); Ngoc-Thach Nguyen, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/587,894

(22) PCT Filed: Dec. 15, 2004

(86) PCT No.: PCT/EP2004/053484

§ 371 (c)(1),
(2), (4) Date: Jul. 28, 2006

(87) PCT Pub. No.: WO2005/081379

PCT Pub. Date: Sep. 1, 2005

(65) Prior Publication Data

US 2007/0159022 A1    Jul. 12, 2007

(30) Foreign Application Priority Data

Feb. 14, 2004  (DE) ................. 10 2004 007 322

(51) Int. Cl.
*H02K 1/12* (2006.01)
(52) U.S. Cl. .................... 310/258; 310/216; 310/89
(58) Field of Classification Search ............... 310/58, 310/61, 51, 254, 258, 259, 216–218, 89
See application file for complete search history.

(56) References Cited

U.S. PATENT DOCUMENTS

| 4,134,036 | A | | 1/1979 | Curtiss | |
|---|---|---|---|---|---|
| 5,331,238 | A | * | 7/1994 | Johnsen | 310/58 |
| 7,102,259 | B2 | * | 9/2006 | Kawaguchi et al. | 310/61 |
| 7,164,218 | B2 | * | 1/2007 | Kimura et al. | 310/216 |

FOREIGN PATENT DOCUMENTS

| DE | 102 07 310 A1 | 9/2003 |
|---|---|---|
| EP | 0 176 839 A1 | 4/1986 |
| EP | 0 806 830 A2 | 11/1997 |

* cited by examiner

*Primary Examiner*—Dang D Le
(74) *Attorney, Agent, or Firm*—Ronald E. Greigg

(57) ABSTRACT

The present invention relates to a stator assembly for an electrical machine, including a housing and a stator, in which the housing has at least one inward-oriented bead extending in the axial direction.

21 Claims, 5 Drawing Sheets

STATOR ASSEMBLY FOR AN ELECTRICAL MACHINE

CROSS-REFERENCE TO RELATED APPLICATIONS

This application is a 35 USC 371 application of PCT/EP 2004/053484 filed on Dec. 15, 2004.

BACKGROUND OF THE INVENTION

1. Field of the Invention

This invention relates to electrical machines, and more particularly to an improved stator assembly for an electrical machine.

2. Description of the Prior Art

Electrical machines are well known in the prior art, for instance in the form of electric motors. Such electric motors often use stator packets which are put together from many stator laminations. These stator laminations are held together by means of a pole housing. The pole housing is shrunk onto the stator laminations by a shrinking process, as a result of which the laminations are held and fixed. Because of the different materials, during motor operation different thermal expansions occur for the housing and the stator laminations. This can lead to indefiniteness of the stator fixation, and can even cause plasticizing of the housing material and damage to the stator. As a result, remachining of the housing or the stator laminations is often necessary in order to meet the required tolerances for the components. Such remachining operations are not only expensive but also cause the creation of chips that cannot always be completely removed. If unremoved chips get between the armature shaft and the stator during operation, this can cause seizing or blocking of the rotor and a short circuit of the stator winding wires. It is therefore desirable to furnish a stator assembly which makes a simple, economical connection and positioning of the electrical terminals between a housing and a stator possible and which in particular avoids metal-cutting machining and remachining.

SUMMARY AND ADVANTAGES OF THE INVENTION

The stator assembly of the invention has the advantage over the prior art that it can be produced especially simply and economically, in particular by deep drawing or extrusion of the housing. A housing of the stator assembly has at least one axially extending and inward-oriented bead. Securing of the stator to the housing is possible at the bead formed in the housing. By means of the resiliently designed bead, a secure connection between the housing and the stator can be assured.

Especially preferably, the stator also has at least one axially extending, inward- or outward-oriented bead. By providing an inward-oriented bead in the housing and in the stator, especially fast and simple connection of the two components to make the stator assembly is possible. The beads may be provided before installation of the stator in the housing, and then fixation of the stator in the housing is effected by means of metal-cutting, resilient clamping of the housing.

To meet especially close tolerances, especially for the inward- or outward-oriented side of the stator, the beads on the housing and the beads on the stator are preferably embodied such that in the installed state, the housing is connected to the stator at a plurality of connecting points. One gap each is embodied in the circumferential direction between the individual connecting points. Thus the housing and the stator are connected in metal-cutting, resilient and clamping fashion at only some points, and thus only very slight forces of deformation have to be exerted on the stator and the housing. This makes it possible to meet even very close positioning tolerances between the stator and the ball bearing seat and thus also the rotor.

Especially preferably, between a bead of the housing and the bead of the stator, there is a gap at the lowest points of the beads in the installed state. This can be achieved especially simply for instance by making the radii of the beads of the housing and of the stator different.

For the sake of attaining the least possible deformation of the stator and housing and to enable a defined positioning, at a transition between a bead and the normal outer diameter of the stator there is a gap of the least possible size at this point between the housing and the stator in the installed state.

Preferably, a plurality of beads are embodied on the housing and on the stator and are spaced apart equally from one another in the circumferential direction. Especially preferably, four or six beads each, because of the measurability of the coaxiality, are formed on the housing and on the stator.

In another preferred embodiment of the invention, the length of the beads on the housing correspond in the axial direction to the length of the stator in the axial direction. As a result, an especially secure, simple connection between the stator and the housing can be made possible.

To further reduce component expenses for the electrical machine, a bearing for an armature shaft of the electrical machine is preferably formed integrally on the housing. Also preferably, securing openings with stop shoulders for the outer race of the ball bearing are additionally formed integrally on the housing, for securing the electrical machine.

The stator is preferably made from many stator laminations made of sheet steel, and the housing is likewise made from a steel sheet, so that during the operation of the electrical machine, no negative influences occur from loosening or high pressure at high and low temperature because of different thermal expansions, or of shrinkages in the cold of the housing and the stator. Also preferably, guide faces for securing a second bearing cap are embodied on the housing. In particular with a bearing cap integrated with the housing, for supporting the armature shaft, an especially high coaxiality between the stator and an armature supported on the housing can be achieved.

The housing is preferably deep drawn, and the beads are preferably formed into the housing by means of pressing. The stator is preferably furnished from a plurality of individual metal sheets that are made by means of stamping.

The present invention also relates to an electrical machine having a rotor-stator relationship according to the invention, and in particular to an electric motor, such as an asynchronous motor, in which there is the least possible air gap between the armature and the stator.

BRIEF DESCRIPTION OF THE DRAWINGS

Preferred exemplary embodiments of the invention are described below in conjunction with the accompanying drawings, in which.

DESCRIPTION OF THE PREFERRED EMBODIMENTS

Below, referring to FIGS. 1 through 6, a stator assembly 1 in a first exemplary embodiment of the present invention includes a substantially cylindrical housing 2 and a stator 4.

Figure 1:
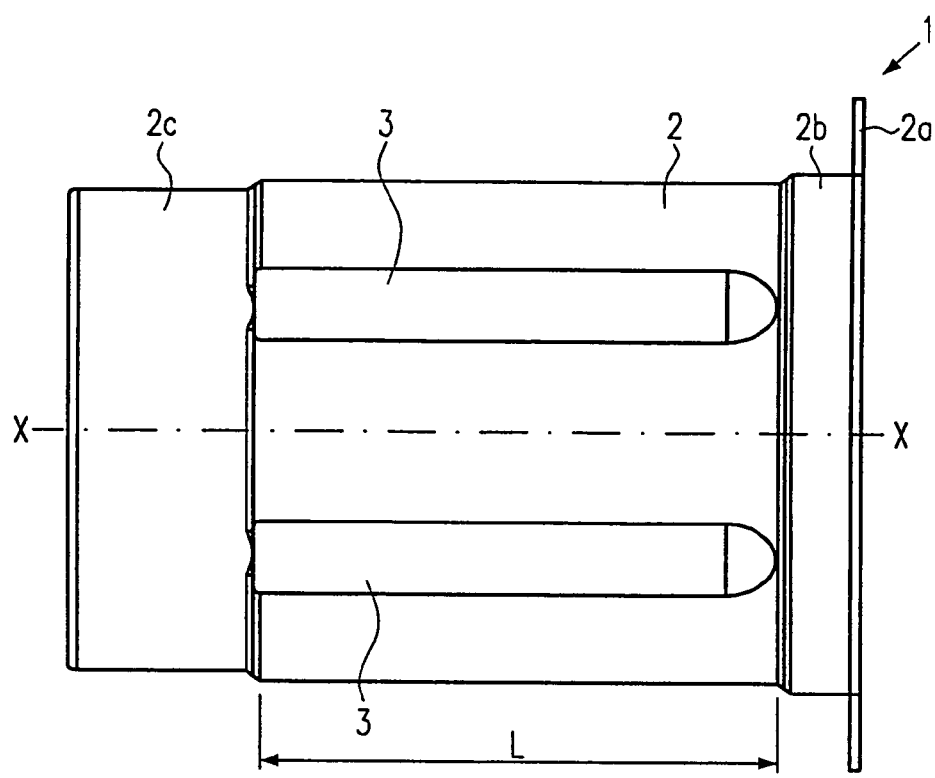
FIG. 1 is a schematic side view of a stator housing in a first exemplary embodiment of the present invention.
Figure 2:
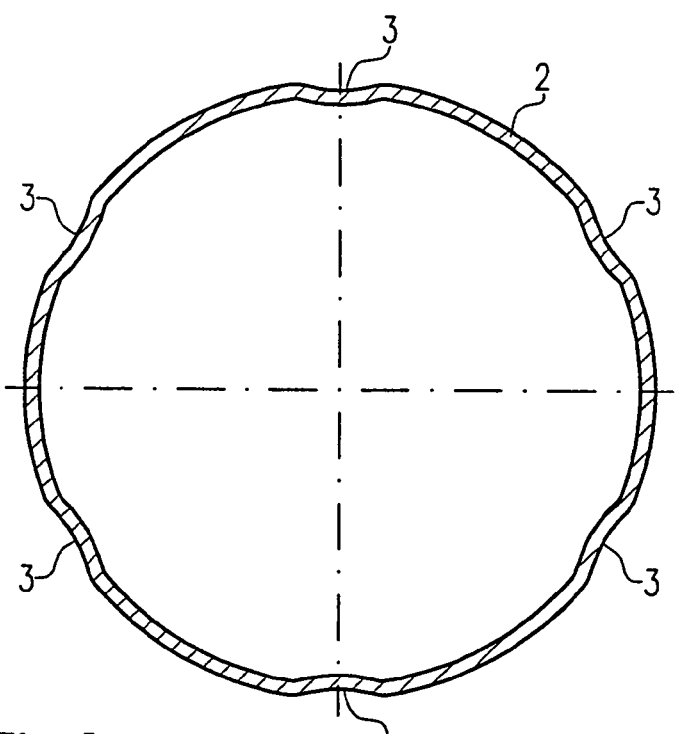
FIG. 2 is a schematic sectional view of a housing shown in FIG. 1.

FIG. 2 shows a sectional view of the housing 2. In the axial direction X-X, six inward-oriented beads 3 are embodied. The beads 3 are disposed along the circumference of the housing 2, at equal spacings from one another. In the axial direction X-X, the beads 3 have a length L, which corresponds to a length 1 of the stator 4 (see FIGS. 1 and 5). The stator 4 is put together in a known way from many individual stator laminations 4a. As can be seen particularly from FIG. 3, there are likewise six inward-oriented beads or notches 5, spaced equally apart along the circumference, embodied on the outer circumference of each stator lamination 4a.

Figure 6:
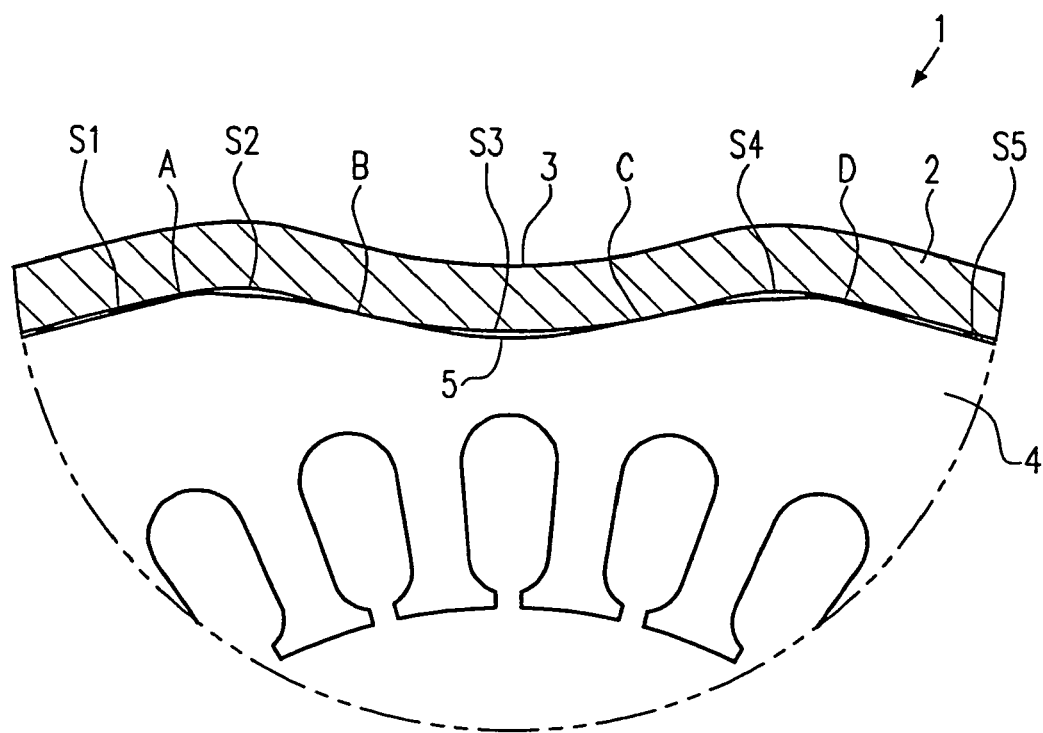
FIG. 6 is an enlarged fragmentary sectional view of a connection between the housing and the stator in the first exemplary embodiment.

FIG. 6 now shows the installed state of the stator lamination packet in the housing 2. The stator laminations are disposed in the housing 2 such that the location of the beads 5 each correspond to the beads of the housing 2. At each bead 3 of the housing, the result is four contact or connecting points A, B, C and D. Between the individual connecting points A, B, C, D, there are respective interstices in the form of gaps S1, S2, S3, S4, S5. More precisely, as shown in FIG. 6, one gap S3 is formed at the lowest point of the bead 5 of the stator 4. Gaps S2 and S4 are also formed between the respective connecting points A and B on the one hand and C and D on the other between the housing 2 and the stator 4; the gaps S2 and S4 are formed at the transition of the stator from the respective bead 5 to the normal outer circumference of the stator.

The housing 2 thus receives the many stator laminations 4a that form the stator, positions the stator, and positions it in such a way that it is fixed via a clamping action between the housing and the stator laminations. Because of the many stator laminations, the result is linear connecting points between the stator 4 and the housing 2.

The housing 2 is made from sheet steel and the individual stator laminations 4a are likewise made from sheet steel, so that a thermal change has no influence on the fixation of the stator in the housing 2 over the entire temperature spectrum. Because of the connection between the housing 2 and the individual stator laminations 4a only at some points, the beads 3 exert a resilient prestressing force on the stator 4, and the prestressing force can be varied as a function of the shape of the bead, for instance the depth of the bead, and/or the radius of the bead. A further possible way of varying the spring force is a suitable choice of a thickness for the housing 2.

The securing of the stator lamination packet 4 can be done such that the stator packet is for instance introduced into the housing, and the beads 3 are then made by pressing, or already preformed beads are pressed into their final shape. Another possible way of securing the stator 4 in the housing 2 can be such that the stator lamination packet is pressed into the interior of the housing 2 counter to the spring force furnished by the beads that have been completely made.

The stator assembly 1 of the invention is especially preferably used in electric motors. As shown in FIG. 1, through openings can be made there in a flange 2a of the housing 2, so that the housing 2 can be fastened to another component, for instance by means of screws. It is also possible in a relatively simple way to introduce a bearing for supporting an armature shaft (not shown) at the cylindrical portions 2b and 2c. The stator assembly of the invention is used especially in electric motors for accessory drives in motor vehicles.

Figure 7:
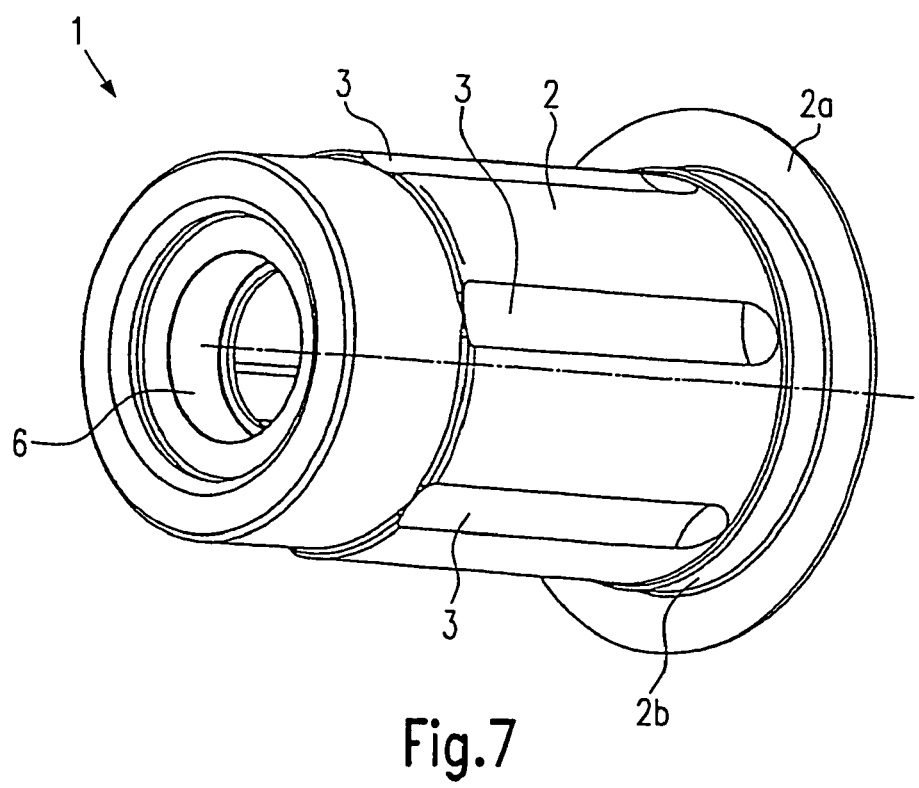
FIG. 7 is a schematic, perspective view of a stator assembly in a second exemplary embodiment of the present invention.
Figure 8:
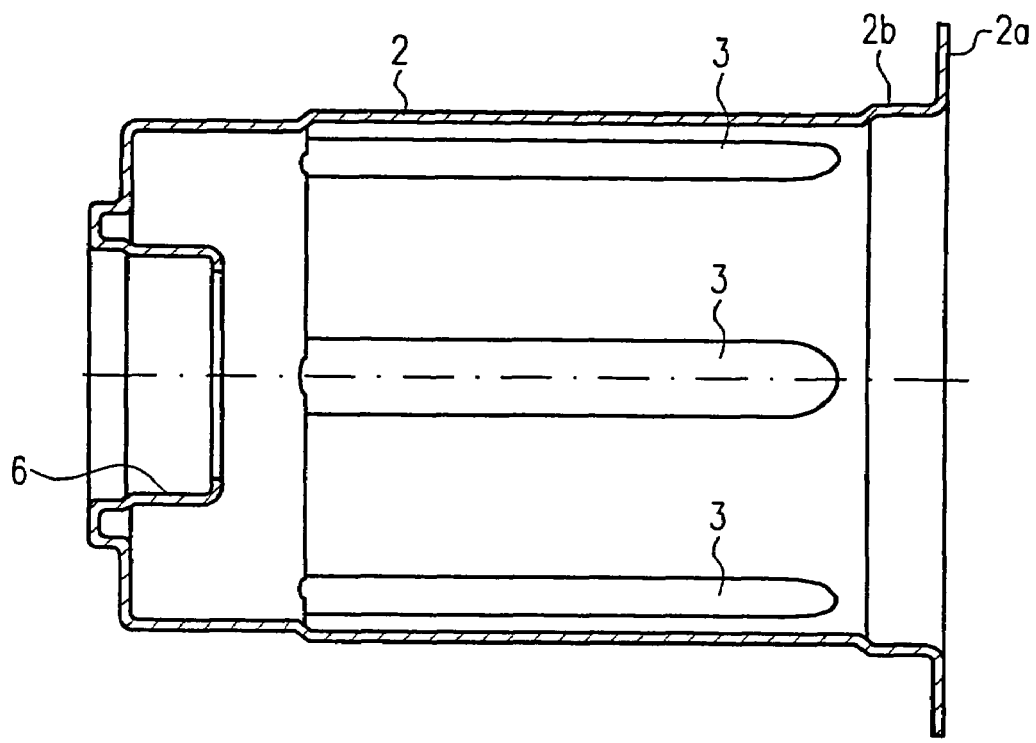
FIG. 8 is a schematic sectional view of the stator assembly shown in FIG. 7.

Referring to FIGS. 7 and 8, a stator assembly 1 in a second exemplary embodiment of the present invention will now be described. Elements that are the same or functionally the same are identified by the same reference numerals as in the first exemplary embodiment.

Unlike the first exemplary embodiment, in the second exemplary embodiment a bearing support 6 for the armature shaft is also formed integrally on one end of the housing 2. The housing 2 is made by deep drawing, for instance. On the other end of the housing 2, a second bearing support or cap can also be inserted in a simple way in the region 2b. To that end, a small shoulder is formed in the region 2b of the housing 2, so that the region 2b serves as a guide ring for an insertion of a second bearing with an armature shaft. This enables very good coaxiality of the armature shaft relative to the housing and thus also to the stator.

Especially preferably, the second bearing is simultaneously also embodied as a cap, so that the housing of the electric motor is covered. A seal can preferably also be introduced in the region 2b between the housing 2 and the second bearing cap. On the one hand, seals can be built in both radially and axially and are simple to install on the housing 2. In addition, a seal (not shown) can also be provided between the flange region 2a and a further connection part of the electrical machine.

Figure 3:
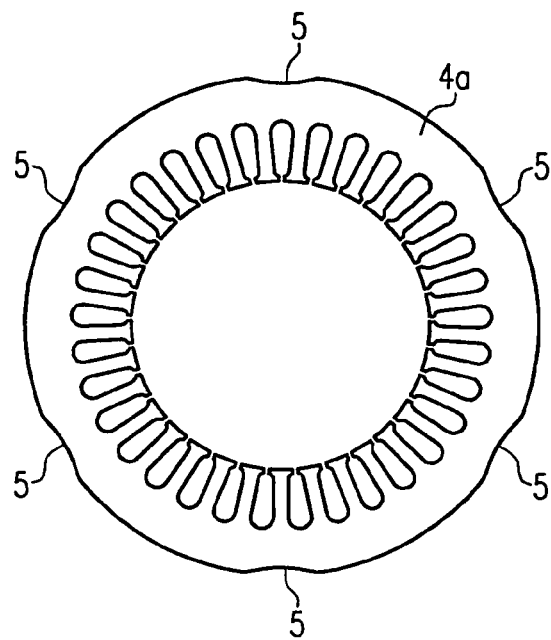
FIG. 3 is a schematic top view on a stator lamination of the first exemplary embodiment.
Figure 4:
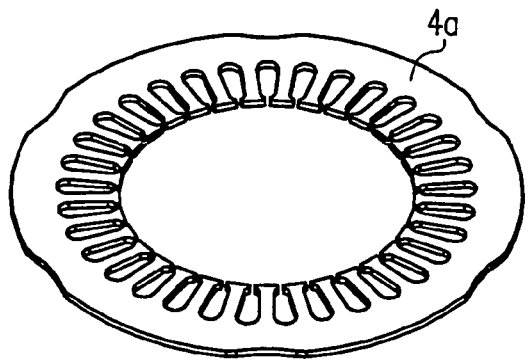
FIG. 4 is a perspective view of the stator lamination shown in FIG. 3.
Figure 5:
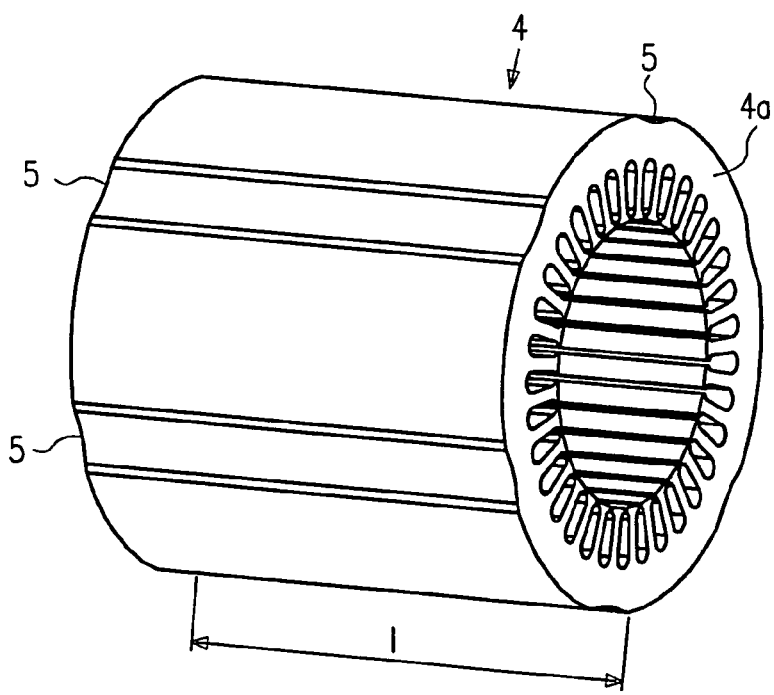
FIG. 5 is a schematic, perspective arrangement of a stator which is put together from many individual stator laminations.

The stator packet used in the second exemplary embodiment corresponds to the stator packet shown in FIGS. 3 through 5 and is joined to the housing 2 as shown in FIG. 6, so that the earlier description above may be referred to.

Figure 9:
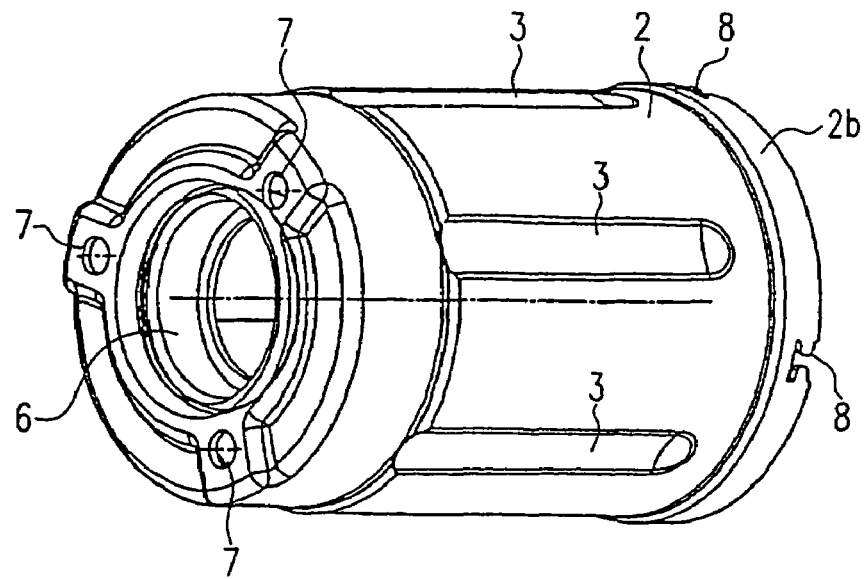
FIG. 9 is a perspective view of a stator assembly in a third exemplary embodiment of the present invention.

In FIG. 9, a stator assembly 1 is shown in a third exemplary embodiment of the present invention. Once again, the same or functionally the same parts are identified with the same reference numerals as in the first exemplary embodiment.

The third exemplary embodiment is identical in particular to the second exemplary embodiment in terms of the characteristic that an integral bearing support 6 is embodied on the housing 2. In addition to the bearing support 6, three securing openings 7 are also integrally embodied on the housing 2. As a result, the housing 2 can be secured to a component. As FIG. 9 also shows, for securing a bearing cap, many recesses 8, which are essentially T-shaped, are embodied on the other end of the housing 2. Once again, seals or the like may be provided in the region 2b of the housing 2 as in the second exemplary embodiment.

Figure 10:
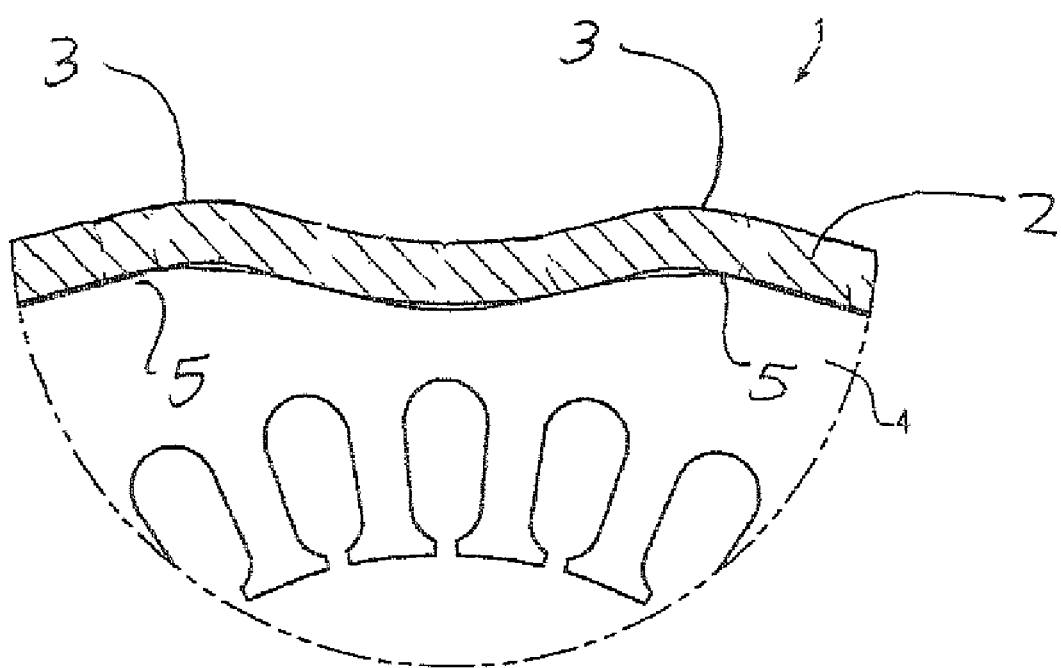
FIG. 10 is an enlarged fragmentary sectional view of a connection between the housing and the stator in a fourth exemplary embodiment.

In FIG. 10, a stator assembly 1 is shown in a fourth exemplary embodiment of the present invention. Once again, the same or functionally the same parts are identified with the same reference numerals as in the first exemplary embodiment.

FIG. 10 shows the installed state of the stator lamination packet in the housing 2. The stator laminations are disposed in the housing 2 such that outward-extending beads 5 each correspond to outward-extending beads 3 of the housing 2. It will be understood that the outward-oriented beads may be formed by pressing like the inward-oriented beads of the previously described embodiments, although in a radially outward direction.

The foregoing relates to a preferred exemplary embodiment of the invention, it being understood that other variants and embodiments thereof are possible within the spirit and scope of the invention, the latter being defined by the appended claims.

The invention claimed is:

1. A stator assembly for an electrical machine, comprising a cylindrical housing, a stator disposed in the housing, at least one inward-oriented bead pressed into the housing and extending in the axial direction, and at least one inward- or outward-oriented bead disposed on the stator extending in the axial direction, wherein an inward-oriented bead is embodied by an indentation in the circumference of the housing or the stator in a radially inward direction and an outward-oriented bead is embodied by a protrusion in the circumference of the housing or the suitor in a radially outward direction, and wherein a shape of the bead disposed on the housing corresponds with a shape of the bead disposed on the stator.

2. The stator assembly as defined by claim 1, wherein the at least one bead on the housing and the at least one bead on the stator are embodied such that in the installed state, the housing and the stator are connected at a plurality of connecting points and one gap each is embodied in the circumferential direction between the respective connecting points.

3. The stator assembly as defined by claim 2, wherein between a bead of the housing and a bead of the stator, there is a gap at the lowest point of the beads in the installed state.

4. The stator assembly as defined by claim 2, wherein, between one bead of the housing and one bead of the stator in the installed state, a gap between the housing of the stator is embodied at a transition from the outer diameter of the stator to the bead.

5. The stator assembly as defined by claim 2, wherein a plurality of beads are embodied on the housing and on the stator, said beads being each spaced apart equally from one another in the circumferential direction.

6. The stator assembly as defined by claim 2, wherein each at least one bead on the housing in the axial direction correspond to a length of the stator in the axial direction.

7. The stator assembly as defined by claim 2, further comprising securing openings formed integrally on the housing for securing the electrical machine.

8. An electrical machine, including a stator assembly as defined by claim 2.

9. The stator assembly as defined by claim 1, wherein between a bead of the housing and a bead of the stator, there is a gap at the lowest point of the beads in the installed state.

10. The stator assembly as defined by claim 9, wherein, between one bead of the housing and one bead of the stator in the installed state, a gap between the housing of the stator is embodied at a transition from the outer diameter of the stator to the bead.

11. The stator assembly as defined by claim 1, wherein, between one bead of the housing and one bead of the stator in the installed state, a gap between the housing of the stator is embodied at a transition from the outer diameter of the stator to the bead.

12. The stator assembly as defined by claim 11, wherein a plurality of beads are embodied on the housing and on the stator, said beads being each spaced apart equally from one another in the circumferential direction.

13. The stator assembly as defined by claim 11, wherein each at least one bead on the housing in the axial direction correspond to a length of the stator in the axial direction.

14. The stator assembly as defined by claim 11, further comprising a bearing support for an armature shaft of the electrical machine formed integrally on the housing.

15. The stator assembly as defined by claim 11, further comprising securing openings formed integrally on the housing for securing the electrical machine.

16. The stator assembly as defined by claim 1, wherein a plurality of beads are embodied on the housing and on the stator, said beads being each spaced apart equally from one another in the circumferential direction.

17. The stator assembly as defined by claim 1, wherein each at least one bead on the housing in the axial direction correspond to a length of the stator in the axial direction.

18. The stator assembly as defined by claim 1, further comprising a bearing support for an armature shaft of the electrical machine formed integrally on the housing.

19. The stator assembly as defined by claim 1, further comprising a bearing support for an armature shaft of the electrical machine formed integrally on the housing.

20. A stator assembly for an electrical machine, comprising a cylindrical housing, a stator disposed in the housing, at least one inward-oriented bead pressed into the housing and extending in the axial direction, and at least one inward- or outward-oriented bead disposed on the stator extending in the axial direction, the at east one inward-oriented bead is embodied by an indentation in the circumference of the housing or the stator in a radially inward direction and the at least one outward-oriented bead is embodied by a protrusion in the circumference of the housing or the stator in a radially outward direction, wherein a shape of the bead disposed on the housing corresponds with a shape of the bead disposed on the stator, the bead disposed on the housing exerts a resilient prestressing on the stator, and the prestressing force can be varied as a function of the shape of the bead.

21. A stator assembly for an electrical machine, comprising a cylindrical housing, a stator disposed in the housing, at least one inward-oriented bead pressed into the housing and extending in the axial direction, and at least one inward- or outward-oriented bead disposed on the stator extending in the axial direction, the at least one inward-oriented bead is embodied by an indentation in the circumference of the housing or the stator in a radially inward direction and the at least one outward-oriented bead is embodied by a protrusion in the circumference of the housing or the stator in a radially outward direction, wherein a shape of the bead disposed on the housing corresponds with a shape of the bead disposed on the stator, and wherein the housing and the stator are made from sheet steel.

* * * * *